United States Patent
Wood et al.

(10) Patent No.: US 11,132,451 B2
(45) Date of Patent: Sep. 28, 2021

(54) SECRET DATA ACCESS CONTROL SYSTEMS AND METHODS

(71) Applicant: Parity Technologies Ltd., London (GB)

(72) Inventors: Gavin Wood, Berlin (DE); Piotr Czaban, London (GB); Sviatoslav Nikolskii, Moscow (RU); Kenneth Kappler, London (GB); Nicolas Gotchac, Berlin (DE)

(73) Assignee: Parity Technologies Ltd., London (GB)

( * ) Notice: Subject to any disclaimer, the term of this patent is extended or adjusted under 35 U.S.C. 154(b) by 346 days.

(21) Appl. No.: 16/119,542

(22) Filed: Aug. 31, 2018

(65) Prior Publication Data

US 2019/0065764 A1 Feb. 28, 2019

Related U.S. Application Data

(60) Provisional application No. 62/595,208, filed on Dec. 6, 2017.

(30) Foreign Application Priority Data

Aug. 31, 2017 (RU) ............................ RU2017130840

(51) Int. Cl.
*G06F 21/62* (2013.01)
*G06F 21/60* (2013.01)
(Continued)

(52) U.S. Cl.
CPC ...... *G06F 21/6209* (2013.01); *G06F 16/1805* (2019.01); *G06F 21/604* (2013.01);
(Continued)

(58) Field of Classification Search
USPC ....................................................... 713/182
See application file for complete search history.

(56) References Cited

U.S. PATENT DOCUMENTS 8,621,036 B1 * 12/2013 L'Heureux ............ G06F 21/62
709/217
2009/0210721 A1 * 8/2009 Phillips ............... G06F 21/6218
713/182
(Continued)

FOREIGN PATENT DOCUMENTS

RU 2015156433 A 7/2017

OTHER PUBLICATIONS

Ibrahim et al., "A robust threshold elliptic curve digital signature providing a new verifiable secret sharing scheme." 2003 46th Midwest Symposium on Circuits and Systems. vol. 1. IEEE, 2003. 6 pages.

(Continued)

*Primary Examiner* — Eleni A Shiferaw
*Assistant Examiner* — Sakinah White Taylor
(74) *Attorney, Agent, or Firm* — Smith Baluch LLP (57) ABSTRACT

The decentralized and distributed architecture of blockchain makes it challenging to store secret data. A Secure Document Access Control System (SEDACS) can store secret data using distributed components without compromising on the distributed security features of the blockchain. SEDACS can include a Secret Store, a blockchain, and a decentralized file system. The blockchain can store rules and permissions for documents that contain the secret data. The Secret Store can generate secret keys that can be used to access the documents. The decentralized file system can store the documents that are encrypted using the secret keys. A user can retrieve the encrypted document provided that the user has the permission to do so. The user can decrypt the encrypted document by decrypting the secret key and using the decrypted secret key to decrypt the document.

16 Claims, 4 Drawing Sheets

(51) Int. Cl.
*H04L 9/30* (2006.01)
*H04L 9/06* (2006.01)
*G06F 16/18* (2019.01)
*G06F 21/64* (2013.01)
*H04L 9/14* (2006.01)
*H04L 9/08* (2006.01)
*H04L 9/32* (2006.01)

(52) U.S. Cl.
CPC ............ *G06F 21/64* (2013.01); *H04L 9/0637* (2013.01); *H04L 9/0894* (2013.01); *H04L 9/14* (2013.01); *H04L 9/3066* (2013.01); *H04L 9/3239* (2013.01); *H04L 2209/38* (2013.01)

(56) References Cited

U.S. PATENT DOCUMENTS

| | | | | |
|---|---|---|---|---|
| 2015/0089231 | A1* | 3/2015 | Oxford | H04L 9/0869 713/171 |
| 2016/0065549 | A1* | 3/2016 | Roth | H04L 63/06 713/170 |
| 2016/0234022 | A1* | 8/2016 | Motika | H04L 9/0822 |
| 2016/0234286 | A1* | 8/2016 | Fausak | H04L 67/148 |
| 2017/0005804 | A1 | 1/2017 | Zinder | |
| 2017/0200137 | A1 | 7/2017 | Vilmont | |
| 2017/0206523 | A1 | 7/2017 | Goeringer et al. | |
| 2017/0207917 | A1* | 7/2017 | Davis | H04L 9/3066 |
| 2017/0228822 | A1 | 8/2017 | Creighton, IV et al. | |
| 2017/0279783 | A1* | 9/2017 | Milazzo | B29C 64/00 |
| 2017/0286717 | A1* | 10/2017 | Khi | G06F 21/6245 |
| 2018/0227275 | A1* | 8/2018 | Russinovich | H04L 9/3265 |
| 2018/0270069 | A1* | 9/2018 | Yan | H04L 9/3239 |
| 2018/0359089 | A1* | 12/2018 | Innes | G06F 16/182 |
| 2019/0028277 | A1* | 1/2019 | Jayachandran | H04L 9/085 |

OTHER PUBLICATIONS

Russian Office Action and Search Report and Translation thereof dated Aug. 19, 2020, 15 pages.

Tang et al., "Efficient multi-party digital signature using adaptive secret sharing for low-power devices in wireless networks." IEEE transactions on wireless communications 8.2 (2009): 882-889.

Tang, "ECDKG: A Distributed Key Generation Protocol Based on Elliptic Curve Discrete Logarithm." SecureComm (2005): 353-364.

* cited by examiner

FIG. 1

SECRET DATA ACCESS CONTROL SYSTEMS AND METHODS

CROSS-REFERENCE TO RELATED APPLICATIONS

This application claims the priority benefit, under 35 U.S.C. § 119, of Russian Patent Application No. 2017130840, entitled "Secure Data Access Control Systems and Methods," which was filed on Aug. 31, 2017, and is incorporated herein by reference in its entirety.

This application also claims the priority benefit, under 35 U.S.C. § 119(e), of U.S. Application No. 62/595,208, entitled "Secure Data Access Control Systems and Methods," which was filed on Dec. 6, 2017, and is incorporated herein by reference in its entirety.

BACKGROUND

A blockchain can be thought of as a state machine that has a state (e.g., permissions or balances of blockchain participants) and rules and permissions for changing that state (e.g., exchange a token to change a balance) according to a smart contract. The permissions and smart contract can be linked to something in the real world, such as a bank account balance or the location of a shipping container. Data stored on the blockchain is public and tamper-proof because it cannot be changed except according to the smart contract's rules, which are enforced by many parties.

SUMMARY

One challenge associated with a blockchain is storing secret data, especially among many parties, in a way that doesn't compromise the blockchain distributed security guarantees. A Secure Document Access Control System (SEDACS) can store secret data using distributed components, including a Secret Store, a blockchain (Proof of Work or Proof of Authority), and content-addressable storage. The blockchain stores metadata, rules, and permissions for each secret document; secret keys used to access the documents are distributed among the key servers that form the Secret Store; and documents are stored in an encrypted form in the distributed content-addressable storage. Validators (blockchain maintainers) enforce the rules and permissions and record transactions associated with storing, accessing, and retrieving the secret documents.

A user stores secret data by first asking one of the Secret Store key servers to generate a new secret key, which is a key used to encrypt the secret data. The new secret key is stored in a. distributed fashion by the Secret Store. If the user has the right to store a new document, a transaction is sent to the Smart Contract to set the permissions of the document. The document is then encrypted using the secret key (given by the Secret Store), and published on a filing system (e.g., a decentralized file system, such as InterPlanetary File System (IPFS)). The hash of the encrypted document is stored in the Smart Contract. The transactions create an audit trail of the user's actions on the blockchain. For a user to retrieve the decryption keys, Secret Store key servers ensure that the user has permission to retrieve the document.

Every Secret Store key server holds a portion of the secret key for the document (also referred to as a "document key"). The Secret Store key servers generates temporary values, based on their respective portions of the secret key for the document. These values, encrypted with the user key, are sent to a master node. In some implementations, the master node is a Secret Store key server to which request to retrieve decryption keys are sent. The role of the "master node" can be transferred from one Secret Store key server to another Secret Store key server. If the master node receives a sufficient number of responses to recover the secret key for the document, it returns the values back to the user. Each response can include corresponding temporary values from other Secret Store key servers. Put differently, if the master node receives sufficient number of temporary values from the other Secret Store key servers to recover the secret key for the document, then the master node can return these values back to the user. If the user retrieves the secret data, the authorities may send their respective encrypted portions of the secret data to the user with public keys for decryption with the user's corresponding private keys.

Because data on the blockchain is public, the blockchain can store references to the secret data instead of the secret data itself. Such a reference may be in the form of a hash, which is a unique, fixed-length bit string produced by applying a hashing function to a file. Cryptographic hashing is reproducible, but not reversible: the same input file always produces the same hash, but each hash is difficult if not impossible to invert, so the input file cannot be reproduced from its hash. Put differently, two different input files cannot be produced from a same unique hash. Therefore, it is not feasible for an attacker to produce a collision (e.g., by producing another input file that has the same hash) that could cause a user to retrieve the wrong document. Hashes are unique, so a modified or encrypted version of a file has a different hash than the original file.

SEDACS identifies secret files on the blockchain by the secret files' hashes and stores the data using a decentralized file system like the InterPlanetary File System (IPFS), that also identifies files by their hashes. The blockchain also stores permissions and transactions associated with each hash: if a user has permission to a hash, the user also has permission to the underlying data. By uniquely identifying a file by its cryptographic hash, the blockchain creates an audit trail without disclosing the file's contents.

The systems and methods disclosed herein improve several technologies, including blockchains, and address several technological problems, including the technological problem of access management of data. To start, the systems and methods disclosed herein address the technological problem of storing and retrieving secret data on a blockchain without compromising on the decentralized and distributed features of the blockchain. This is an improvement to blockchain technology. Inventive systems and methods can also be used to store data in a decentralized manner by declaring permission rights for the data. Said another way, they can store data in a decentralized manner while declaring users who have access to parts of the data using an expressive Access Control Language (ACL).

In one implementation, a method of storing an encrypted file using a blockchain comprises creating a cryptographic hash of the encrypted file. The method also comprises associating file permissions with the cryptographic hash. The method also comprises sending a transaction representing the cryptographic hash and the file permissions from an originator to the blockchain. The blockchain can store the transaction. The method also comprises transmitting the encrypted file from the originator to a host.

In some instances, creating the cryptographic hash includes using a first key from a key store at the originator. In some instances, the originator includes a middleware. The middleware can interconnect the originator and the host.

Transmitting the encrypted file can include transmitting the encrypted file to the host via the middleware.

In some instances, the originator can be directly connected to a decentralized file system in the host. Transmitting the encrypted file to the host can include inserting the encrypted file into the decentralized file system via a blockchain Application Programming Interface (API).

The method can further comprise requesting a secret from a secret store at the host, re-encrypting the file using the secret, and storing the file in a decentralized file system at the host.

In one implementation, a method of retrieving an encrypted file using a blockchain comprises viewing file permissions stored on the blockchain. The file permissions can be associated with the encrypted file. The method also comprises determining that the user may retrieve the file based on the file permissions. The method also comprises sending a transaction requesting the encrypted file from the client to the blockchain. The method also comprises receiving the encrypted file and a first key to decrypt the encrypted file at the client from a server connected to the blockchain.

The method can further comprise decrypting the first key at the client with a second key stored by the client to obtain a decrypted first key, and decrypting the encrypted file at the client with the decrypted first key.

In some instances, the first key can be an encrypted secret generated at a secret store at the server. The method can further comprise decrypting the encrypted secret at the client with a second key stored by the client to obtain a decrypted secret, and decrypting the encrypted file at the client based on the decrypted secret.

In some instances, the client can include a middleware that connects the client and the server. Receiving the encrypted file can include receiving the encrypted file and the first key to decrypt the file at the middleware.

In some instances, the client is directly connected to a decentralized file system at the server. Receiving the encrypted file at the client includes receiving the encrypted file from the decentralized file system.

In one implementation, a method for storing secret data on a blockchain without compromising on blockchain distributed security guarantees comprises transmitting a first blockchain transaction from a first node to a blockchain. The first blockchain transaction can include file permissions for a document that includes the secret data. The method can also comprise requesting a first key from a second node at the first node. The method can also comprise encrypting the document at the first node based on the first key to obtain an encrypted document. The method can also comprise transmitting encrypted document to the second node. The method can also comprise requesting a secret key from a secret store at the second node. The secret key can be based on a second key associated with the second node. The method can also comprise re-encrypting the encrypted document at the second node based on the secret key to obtain a re-encrypted document and storing the re-encrypted document in a decentralized file system at the second node.

In some instances, the method can further comprise receiving a request to retrieve the document from a third node. The method can further comprise: determining that the third node may retrieving the document based on the file permissions on the blockchain, receiving the request from the third node at the second node to retrieve the document, retrieving the secret key from the secret node at the second node, and transmitting the secret key and the re-encrypted document to the third node.

The method can further comprise decrypting the secret key at the third node based on a third key stored by the third node to obtain a decrypted secret key and decrypting the re-encrypted document with the decrypted secret key at the third node. In some instances, requesting the secret key can include initiating an Elliptic Cure Distributed Key Generation (ECDKG) session.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTIONS OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

DETAILED DESCRIPTION

Figure 1:
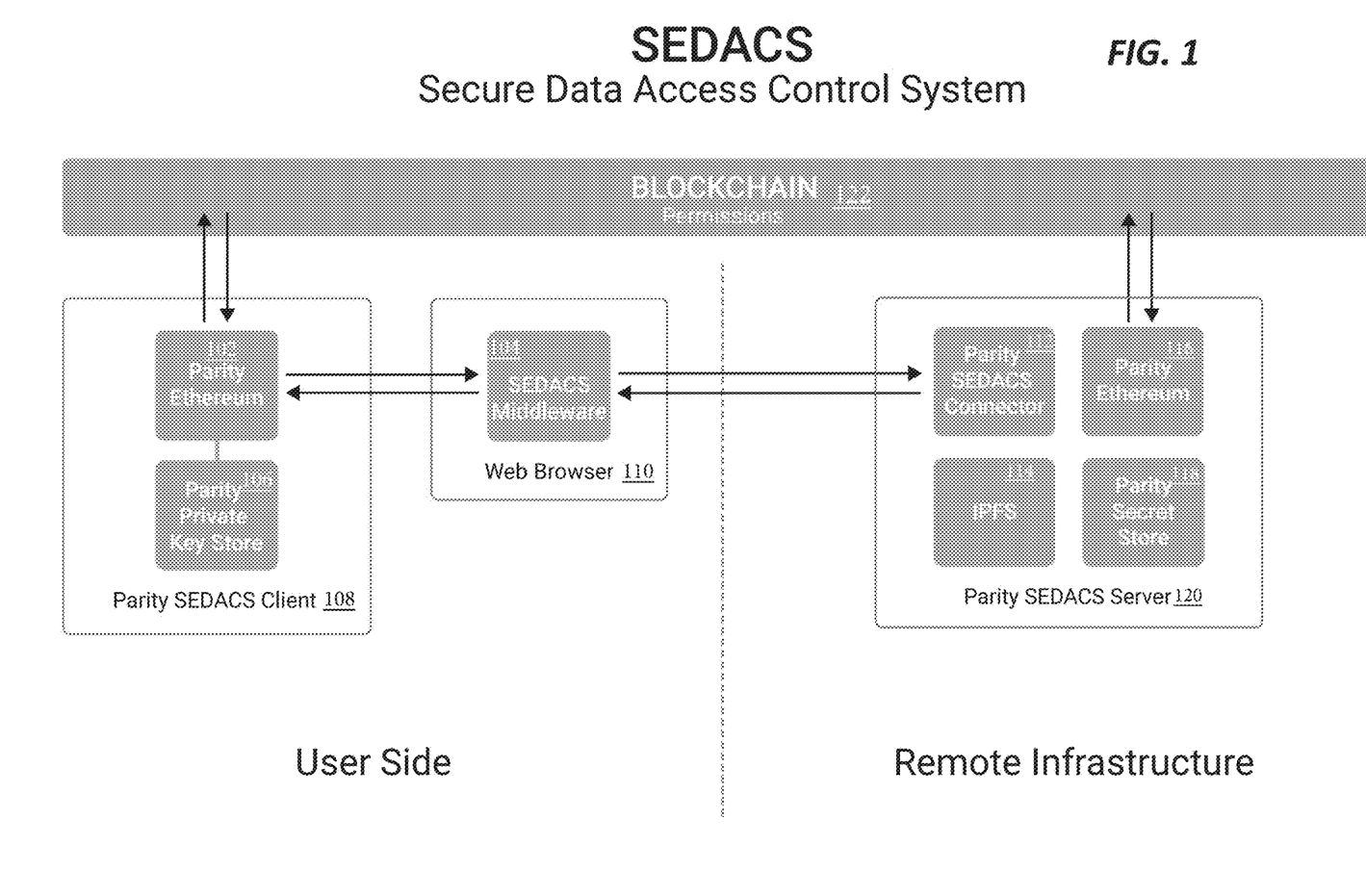
FIG. 1 shows a Secure Document Access Control System (SEDACS).

FIG. 1 shows a SEDACS (Secure Data Access Control System) that enables secure sharing of data and permissions management without a trusted third party. It leverages a number of new technologies including blockchain, smart contracts, threshold cryptography, distributed key generation, and content addressed distributed file storage. Thanks to these new technologies, it is possible to achieve an unprecedented level of security. Contrary to known solutions, no single point of failure is present and every activity on the system can be recorded immutably on the blockchain.

SEDACS includes two different node types: (1) hosts (forming a trust-free network) provide data storage and trust distribution and (2) originators allow users to access the system. The hosts and originators can be implemented as SEDACS servers and clients, respectively, in a client-server architecture. The hosts and originators can also be implemented as peers in a peer-to-peer network. Other architectures are also possible. In any event, the hosts and originators are coupled to a blockchain and form part of a SEDACS network that is used for distributing the blockchain transactions and blocks.

In SEDACS, the blockchain stores rules and permissions for accessing documents. The SEDACS servers (hosts) include a Secret Store and a decentralized file system. The Secret Store generates secret keys that are used to access the documents. The documents are encrypted using the secret keys and are stored in the decentralized file system. The documents can be retrieved by the SEDACS client (originator) and can be decrypted by decrypting the secret keys. In addition, the servers can expose a Representational State Transfer (REST) interface to clients for upload and download of encrypted data.

SEDACS Client

As shown in FIG. 1, a SEDACS Client 108 (originator) can be implemented as a computing device with a processor, memory, network interface, and user interface (e.g., touchscreen, conventional display, keyboard, touchpad, mouse, etc.). In operation, the SEDACS Client 108 provides an Ethereum™ client 102, a private key store 106, and SEDACS Middleware 104. The Ethereum™ client 102 interfaces with the blockchain 122. The private key store 106 stores the user's private key(s) for accessing stored documents. The SEDACS Middleware 104 can be implemented as a JavaScript™ library that makes it easy to build user interfaces (UIs) served via a web browser 110 and suited to a particular application. It orchestrates communication between the local Ethereum™ Client (and by extension the smart contracts), UI, and either SEDACS Servers 120 or directly with key servers and IPFS nodes 114.

The UI can enable users to create a new account, manage permissions, and upload and view the data. Any other functionality that leverages smart contracts can be integrated into the UI. Each functionality may be subject to appropriate permissions and may leave an immutable footprint in the audit trail as desired.

Secret Store

The Secret Store 118 is a network of key servers (not shown in FIG. 1), which are capable of distributed secret key generation, storing secret keys in a distributed fashion (part secret storage), and encrypted part secret collection based on blockchain permissions. Secret key generation for a given hash can be triggered by making a request to one of the key servers. Upon receiving secret key generation request, the key server that receives the request starts an Elliptic Curve Distributed Key Generation (ECDKG) session. The ECDKG session generates a "server key pair" for a given threshold number of key servers within the Secret Store 118. Put differently, at least a threshold number of key servers can recompute the secret portion of a "server key pair" by combining their respective/corresponding secret portions. At the same time, the public portion of the server key pair remains known to all the key servers within the Secret Store 118. Said another way, the key servers compute and store the corresponding secret portion of the server key pair while the public portion of the server key pair is known to all the key servers.

Then the SEDACS client 108 or one of the key servers randomly generates the secret key for the document. The secret key for the document is in fact a point on the Elliptic curve. This point on the Elliptic curve can be transformed before it is used in a document encryption process (e.g., by taking its x coordinate). The generated document key can be encrypted with the public portion of the server key pair using Elliptic Curve El Gamal encryption algorithm. The encrypted document key can be broadcast to every other key server within the Secret Store 118. Before generation of the secret key, the user requesting the generation of the secret key specifies a threshold number of servers needed for retrieval. Secret retrieval for a given hash is initiated by making a request to one of the key servers.

In response to the request, the key server communicates with other key servers about blockchain permissions of the requester to the hash. Said another way, the key server communicates with other key servers about whether the user has document permission to access the document with the secret key. For instance, a master node key server can ask every other key server within the Secret Store 118 whether the key servers agree that the user/requestor has permission to access the document. The key servers execute a blockchain contract to check the document permission. In response, the key servers respond "Agree/Disagree."

If a threshold number of key servers comes to an agreement over the permissions, then the key servers send their part secrets encrypted with the requester's public key to the requestor. To decrypt the secret key for the document, the threshold number of key servers collaborate to recompute the private and/or the secret portion of their respective server key pair. In this manner, the secret key is stored safely in a distributed manner. For a service contract application program interface (API), each secret generation and retrieval request can be recorded on the blockchain. In some implementations, each key server can be implemented as a set of instructions that are executed by one or more processors.

SEDACS Server

A SEDACS Server 120 (host) is a way to bundle a number of different components which form a distributed network. A SEDACS Server network is a combination of a blockchain 122, Secret Store 118, and distributed file system (e.g., IPFS 114).

Each participating party should run at least one SEDACS Server 120 to enable security via trust distribution. The SEDACS Server 120 can be packaged as a Docker Compose solution, optionally hosted by Parity Technologies. This makes it easy to distribute the blockchain processing, secret storage, and encrypted document storage.

As shown in FIG. 1, the SEDACS Server 120 can be implemented as a computing device with a processor, memory, and user interface (e.g., touchscreen, conventional display, keyboard, touchpad, mouse, etc.). In operation, a SEDACS Server 120 can provide a SEDACS Connector 112, an Ethereum™ client 116, a Secret Store 118, and an IPFS node 114. The SEDACS Connector can interface directly with the client 108 via the SEDACS Middleware 104. The Ethereum™ client 116 interfaces with the blockchain 122. The Secret Store 118 stores the part secrets for encrypting documents. And the IPFS 114 stores encrypted documents.

SEDACS Properties

The blockchain is the only source of permissions.

Each document insertion, document retrieval, and alteration of permissions can be recorded alongside the authorizing identity on the blockchain, a cryptographic database giving strong guarantees over tamper proofing and uptime.

Documents are stored and communicated in a strongly encrypted form (e.g., SECP256kl ECIES, symmetric-key encryption, etc.).

Users receive documents encrypted with their public key.

A document is identified by the cryptographic digest (hash) of its contents, which means that a modified document is considered to be a different document than the corresponding original document.

Storing a File in SEDACS

Figure 2:
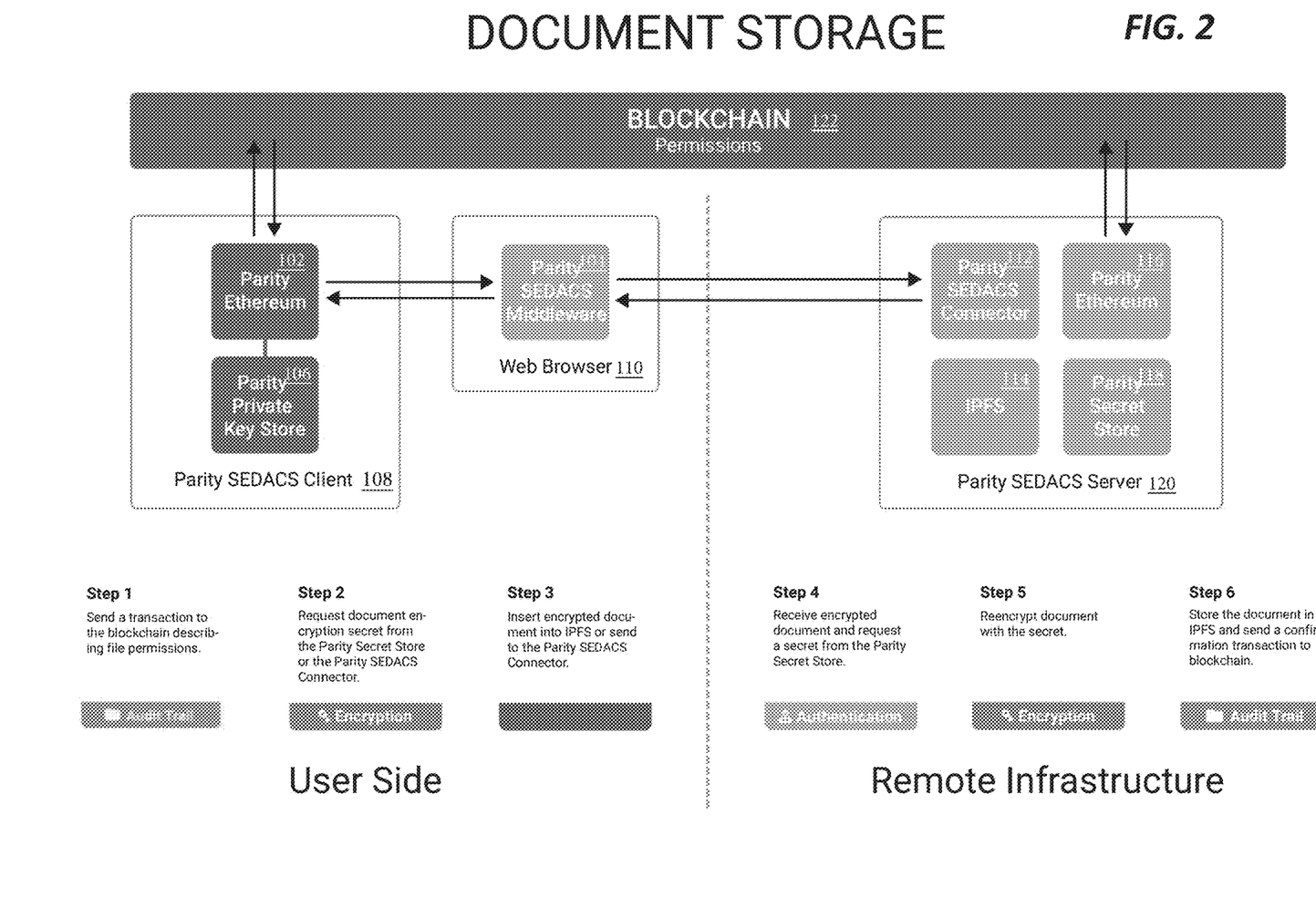
FIG. 2 illustrates a process for storing a document to a SEDACS.

FIG. 2 illustrates a process for storing a file in SEDACS from a SEDACS Client 108. Some of the steps in this process involve encrypting and transferring the file, and other steps create portions of an audit trail that maintains the integrity and security of the file and the system.

The process can be completed in two different ways, depending if the SEDACS Client 108 has access to an IPFS node 114 or to the SEDACS Server 120.

Storing a File in SEDACS Using a SEDACS Server

In step 1, a user sends a transaction to the blockchain 122 using a personal private key from the client's 108 private key store 106. The permissions associated with the encrypted file can be described in the transaction's data. These permissions can whitelist and can recognize and authorize the public key associated with personal private key. In step 2, the user encrypts the file with a SEDACS Server public key (public portion of the "server key pair" as described above) using the SEDACS Middleware 104 at the client 108. In step 3, the user sends the encrypted file directly to the SEDACS Server 120 via the SEDACS Middleware 104.

In step 4, the SEDACS Connector 112 receives the encrypted file from the SEDACS Client 108. It also checks the blockchain 122 for the associated transaction to confirm that the document's permissions were sent to the blockchain. In step 5, the SEDACS Server 120 requests a secret key from the Secret Store 118. The responses from the Secret Store 118 are encrypted with the user's public key. The SEDACS Server 120 encrypts the file with the encrypted secret key. And in step 6, the SEDACS Server 120 stores the encrypted file in IPFS 114. It also sends another transaction to the blockchain 122 confirming receipt and storage of the encrypted file.

In summary, the file is initially encrypted at the client 108 with the SEDACS server public key. The encrypted file is sent to the SEDACS server 120. The SEDACS server 120 requests the secret key from the Secret Store 118. The secret key from the Secret Store 118 is encrypted with the user's public key. The SEDACS server 120 decrypts the encrypted secret key with the SEDACS Server's private key. The responses from the Secret Store 118 are also decrypted with the SEDACS Server's private key, and the file is then re-encrypted with the decrypted secret key.

Storing a File in SEDACS Directly

In some implementations, the SEDACS client 108 may be directly connected to the IPFS 114. In such implementations, the interaction between the SEDACS client 108 and the secret store 118 can be performed without a direct connection between the secret store 118 and the SEDACS middleware 104. Instead, the SEDACS client 108 can communicate with the secret store 118 using a secret store blockchain Application Programming Interface (API). This makes links between the SEDACS client 108 and the SEDACS server 120 unnecessary if the SEDACS client 108 has a direct connection to the IPFS 118.

In such implementations, in step 1, the user sends a transaction to the blockchain using a personal private key from the client's private key store. The permissions associated with the encrypted file can be described in the transaction's data. These permissions can whitelist the public key associated with personal private key. In step 2, the SEDACS Middleware requests a secret key from the Secret Store and then encrypts the file with it. The file can then be directly inserted into IPFS in step 3.

Retrieving a File from SEDACS

Figure 3:
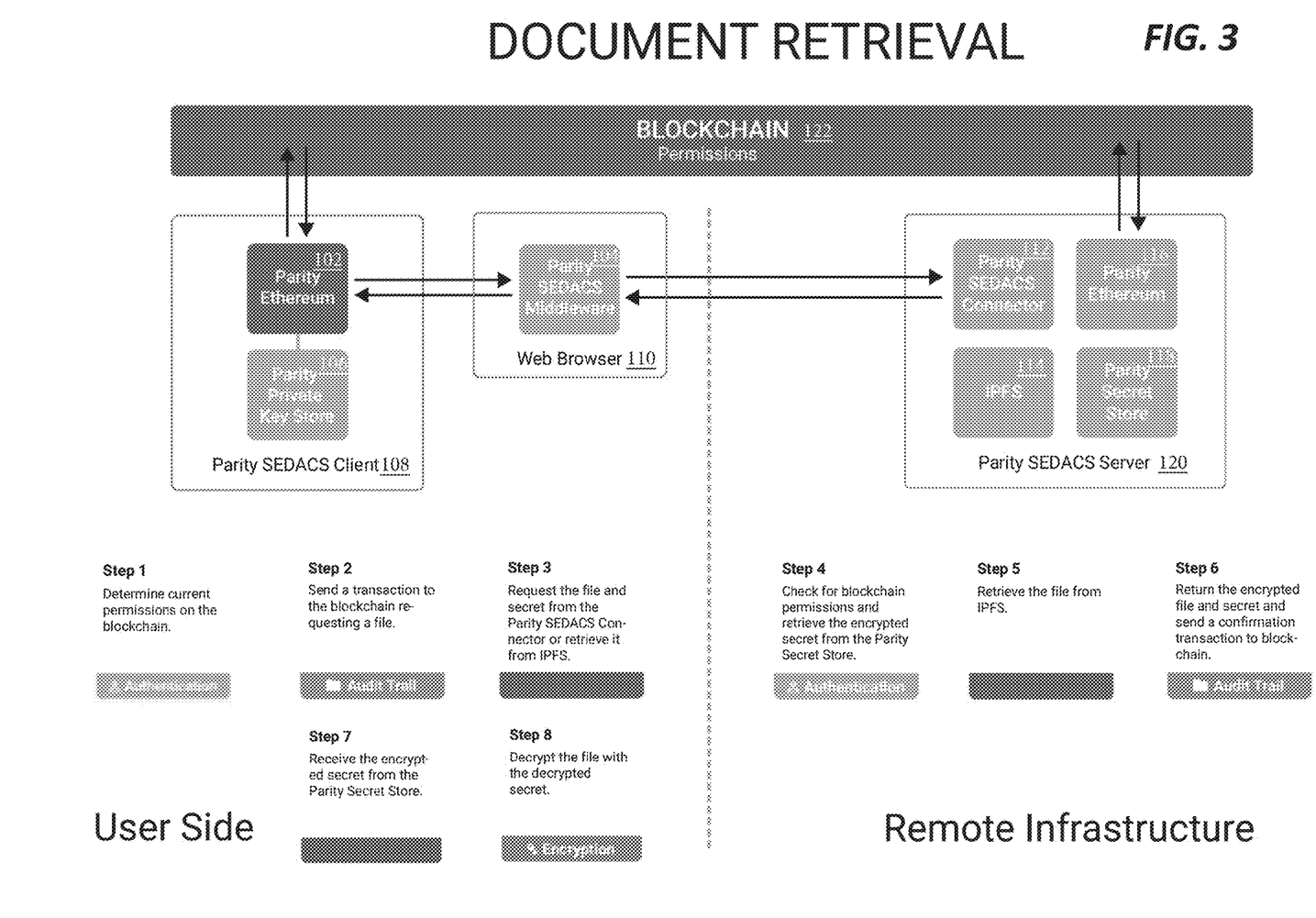
FIG. 3 illustrates a process for retrieving a document from a SEDACS.

FIG. 3 illustrates a process for retrieving a file to SEDACS Server 120 from a SEDACS 108 Client using the system shown in FIG. 1. In step 1, the user uses the SEDACS Client 108 to view the document's current permissions. If the user has permission to retrieve the document, the SEDACS Client 108 sends a transaction requesting the document to the blockchain 122 in step 2. In step 3, the SEDACS Middleware 104 sends a request to the SEDACS Server 120 for the document itself or retrieves the encrypted file directly from the IPFS 114.

Remote steps 4-7 are used if the user does not run an IPFS node or a Secret Store node. Put differently, remote steps 4-7 are used if the user cannot store and retrieve documents directly on a distributed file system such as IPFS. In step 4, the SEDACS Server 120 checks the blockchain 122 for the document retrieval transaction. It retrieves the document from the IPFS 114 in step 5. And in step 6, the SEDACS Server 120 sends the encrypted document along with the encrypted part secrets to the client 108 and sends a transaction confirming document retrieval and transmission to the blockchain 122.

In step 7, the SEDACS Client 108 receives the encrypted document and secret key from the SEDACS Server 120. In step 8, the secret key is decrypted with the user's private key and the decrypted secret key is used to decrypt the document at the SEDACS Client 108. In some implementations, the decryption method can include: (1) ECIES decryption—to decrypt the response from the Secret Store that is encrypted using ECIES with the requester's public key, (2) EcElGamal decryption—to decrypt the encrypted secret key for the document following the ECIES decryption, and (3) Decryption method corresponding to encryption method used for document—using symmetric decryption such as AES, and/or the like following the decryption of the encrypted secret key.

As mentioned above, the SEDACS Middleware 104 can retrieve the encrypted file directly from the IPFS in step 3. In this case, the SEDACS Middleware 104 requests the secret key directly from one of the key servers in the Secret Store 118 instead of from the SEDACS Server 120. Alternatively, this interaction can be performed with a direct connection between the SEDACS Middleware 104 and the Secret Store 118 using blockchain transactions as described above. The SEDACS Client 108 decrypts the secret key with the user's private key and uses it to decrypt the document as in step 8.

Changing File Permissions

Figure 4:
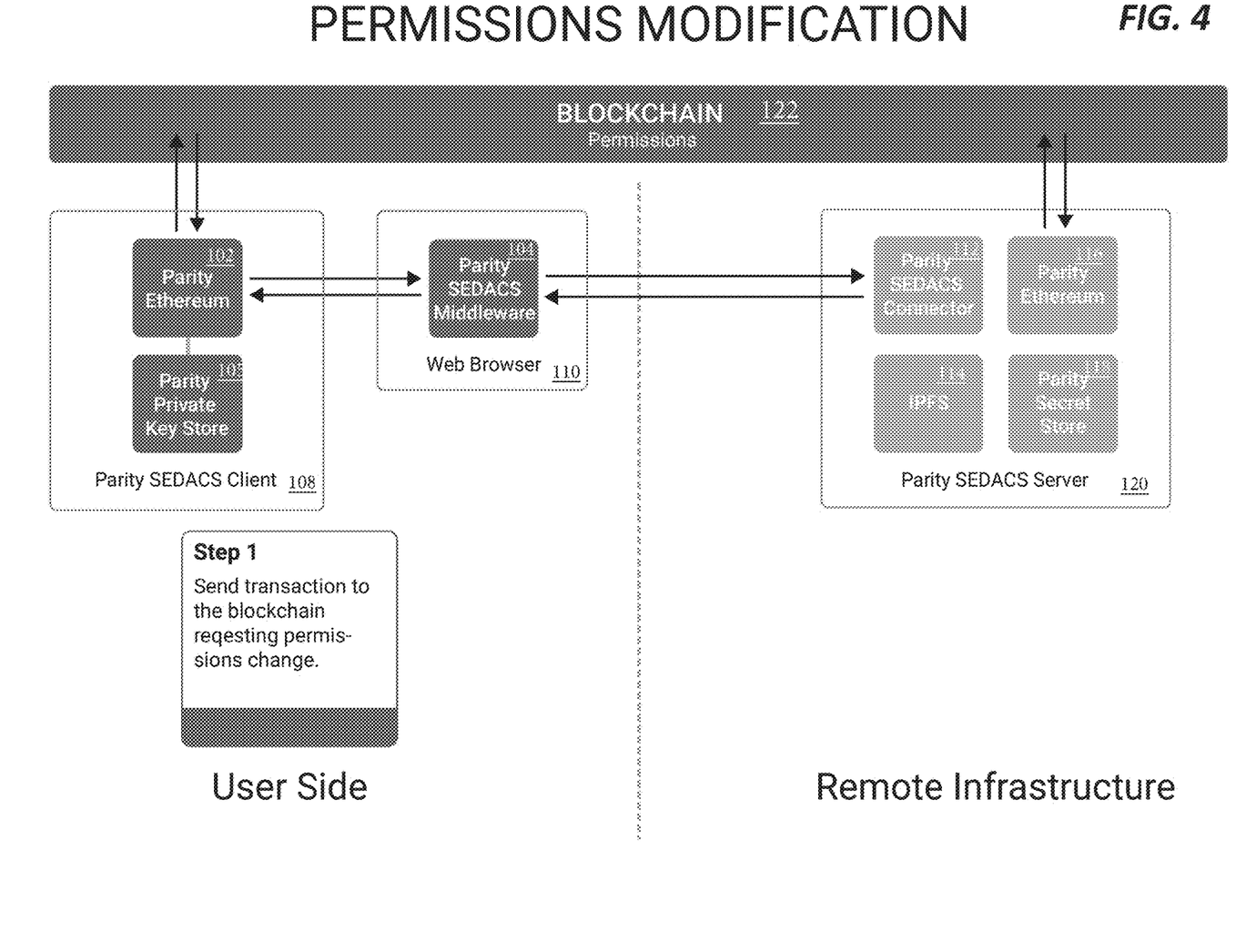
FIG. 4 illustrates a process for changing a user's permissions on a SEDACS.

If the user has the appropriate permissions for a document stored on SEDACS, the user can change the document's permissions by sending a transaction to the blockchain requesting the permission change as shown in FIG. 4. The transaction is then included in the Blockchain, which constitutes a permission modification. SEDACS Middleware provides instant feedback of transaction inclusion.

Example Implementation of Storing and Retrieving Documents Using SEDACS

In the example below a user U encrypts a document D through SEDACS and shares it with user Q. Each user (e.g., user U and user Q) have a public and secret key pair. For example, public and secret key pair PK(U) and SK(U) respectively for the user U, and PK(Q) and SK(Q) respectively for user Q. The SEDACS server is a service accessible from the outside through HTTP requests. An account, say S, is used from the service to send transactions to the blockchain, and the public key for the account S is publicly known as PK(S).

Encryption—Storing the Document

Consider that user U wants to store the document D and give permission to users U and Q.

The user U hashes the document D with the CIDv0 algorithm, creating hash H0—the ID of the document.

The user U sends a transaction to the Blockchain, specifying that the document with the hash H0 can be accessed by PK(U) and PK(Q) (hence users U and D).

The user U encrypts the document D with PK(S), the public key of the SEDACS server=>enc(S, D).

The user U signs the document hash H0=>sign(U, H0).

The user U sends to the SEDACS server H0, sign(U, H0) and enc(S, D).

The SEDACS server gets PK(U) from sign(U, H0) and H0, and checks that U is allowed to store documents.

The SEDACS server decrypts enc(S, D) with its secret key SK(S), which gives D.

The SEDACS server signs H0=>sign(S, H0).

The SEDACS server send to the Secret Store H0 and sign(S, H0), and gets back from the Secret Store and encryption key, EK.

The SEDACS server encrypts the document D with EK=>enc(D).

The SEDACS server stores on IPFS the encrypted document enc(D) which has an id H1 (hash of the encrypted document).

The SEDACS server sends a transaction on the Blockchain that stores the link between H0 and H1 (the hash of the document pointing to the hash of the encrypted document).

The user U sends a transaction that ensures that document D can be accessed by U and Q. The user U then encrypts the document with the public key of the SEDAC's server and sends a request to the server to store the document. The server asks the Secret Store for an encryption key for the documents D by signing the hash of the document D with the Server's own secret key. The server then encrypts the document with the Secret Store encryption key and stores it in the IPFS and also sends a transaction to create a link between the hash of the document and the hash of the encrypted document (i.e., the link between the document's ID and the encrypted document's ID).

Decryption—Retrieving a Document

Consider that user Q wants to read document D

The user Q sends a transaction on the Blockchain to request access to document D, which succeeds since there is a permission for user D to view this document.

The user Q signs the hash H0 (sign(Q, H0)) and sends H0 and sign(Q, H0) to the SEDACS server.

The SEDACS server checks that the user Q (retrieved from the signed hash) has the right to access document D.

The SEDACS server asks for a decryption key to the secret store by sending H0 and sign(Q, H0): the Secret Store answers with decryptions keys DKs.

The server retrieves H1 from H0 from the contract (set on point 12).

The server retrieves the encrypted document enc(D) from IPFS with H1.

The server sends a transaction to the Blockchain to log that the document D have been retrieved by user Q.

The server sends back to user Q the decryption keys DKs and the encrypted document enc(D).

The user Q decrypts the document locally with DKs and enc(D).

The user Q sends a transaction to request access to document D. The transaction succeeds only if user Q is given permission to access document D. The user Q then requests the SEDAC's server to retrieve the document by signing the hash of the document (H0). The server checks that the user Q has access to the document and ask the Secret Store for decryption keys with the hash signed by Q. The server retrieves the IPFS ID of D from the contract, gets the encrypted document from IPFS, and sends back the decryption keys along with the encrypted document to Q. User Q then proceeds to decrypt the document locally from the encrypted document and the decryption keys that the user Q got from the SEDACS server.

CONCLUSION

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize or be able to ascertain, using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising"

can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of" or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A method of storing an encrypted file using a blockchain, the method comprising:
   creating a cryptographic hash of the file;
   associating file permissions with the cryptographic hash of the file;
   sending a first transaction representing the cryptographic hash of the file and the file permissions from an originator to the blockchain, the blockchain storing the transaction;
   encrypting the file using a public key of a host;
   transmitting the encrypted file from the originator to the host;
   re-encrypting the encrypted file by the host;
   storing the re-encrypted file at the host;
   creating a cryptographic hash of the re-encrypted file; and
   sending a second transaction from the host to the blockchain, the second transaction representing a link between the cryptographic hash of the file and the cryptographic hash of the re-encrypted file.

2. The method of claim 1, wherein creating the cryptographic hash of the file includes using a first key from a key store at the originator.

3. The method of claim 1, wherein the originator includes a middleware interconnecting the originator and the host.

4. The method of claim 3, wherein transmitting the encrypted file includes transmitting the encrypted file to the host via the middleware.

5. The method of claim 1, wherein the originator is directly connected to a decentralized file system in the host.

6. The method of claim 5, wherein transmitting the encrypted file to the host includes inserting the encrypted file into the decentralized file system via a blockchain Application Programming Interface (API).

7. The method of claim 1, wherein re-encrypting the encrypted file and storing the re-encrypted file at the host comprises:
   requesting a secret from a network of key servers at the host;
   re-encrypting the encrypted file using the secret; and
   storing the re-encrypted file in a decentralized file system at the host.

8. A method of retrieving an encrypted file using a blockchain, the method comprising:
   receiving a request, from a client, for a user to access the encrypted file, the request including a first cryptographic hash, the first cryptographic hash being signed by the user requesting the encrypted file;
   in response to the request, viewing file permissions stored on the blockchain, the file permissions being associated with the encrypted file;
   determining that the user has permission to retrieve the encrypted file based on the file permissions and the first cryptographic hash;
   retrieving a first key to decrypt the encrypted file from a network of key servers using the first cryptographic hash;
   retrieving a second cryptographic hash associated with the encrypted file using the first cryptographic hash;
   sending a transaction requesting the encrypted file to the blockchain, the transaction including the second cryptographic hash; and
   receiving, at the client, the encrypted file and the first key to decrypt the encrypted file;
   wherein the first key is an encrypted secret generated at a network of key servers and further comprising:
   decrypting, at the client, the encrypted secret with a second key stored by the client to obtain a decrypted secret; and
   decrypting, at the client, the encrypted file based on the decrypted secret.

9. The method of claim 8, wherein the client includes middleware interconnecting the client and the server.

10. The method of claim 9, wherein receiving the encrypted file includes receiving, at the middleware, the encrypted file and the first key to decrypt the file.

11. The method of claim 8, wherein the client is directly connected to a decentralized file system at the server.

12. The method of claim 11, wherein receiving, at the client, the encrypted file includes receiving the encrypted file from the decentralized file system.

13. A method for storing secret data on a blockchain without compromising blockchain distributed security guarantees, the method comprising:
   transmitting, from a first node, a first blockchain transaction to the blockchain, the first blockchain transaction including file permissions for a document that includes the secret data;
   requesting, at the first node, a first key from a second node;
   encrypting, at the first node, the document based on the first key to obtain an encrypted document;
   transmitting, to the second node, the encrypted document;
   requesting, at the second node, a secret key from a network of key servers, the secret key being based on a second key associated with the second node;
   re-encrypting, at the second node, the encrypted document based on the secret key to obtain a re-encrypted document;
   storing the re-encrypted document in a decentralized file system at the second node; and
   receiving, from a third node, a request to retrieve the document.

14. The method of claim 13, further comprising:
   determining that the third node has permission to retrieve the document based on the file permissions on the blockchain;
   receiving, at the second node, the request from the third node to retrieve the document;
   retrieving, at the second node, the secret key from a secret node; and
   transmitting the secret key and the re-encrypted document to the third node.

15. The method of claim 14, further comprising:
   decrypting, at the third node, the secret key based on a third key stored by the third node to obtain a decrypted secret key; and
   decrypting, at the third node, the re-encrypted document with the decrypted secret key.

16. The method of claim 13, wherein requesting the secret key includes initiating an Elliptic Curve Distributed Key Generation (ECDKG) session.

* * * * *